UNITED STATES PATENT OFFICE.

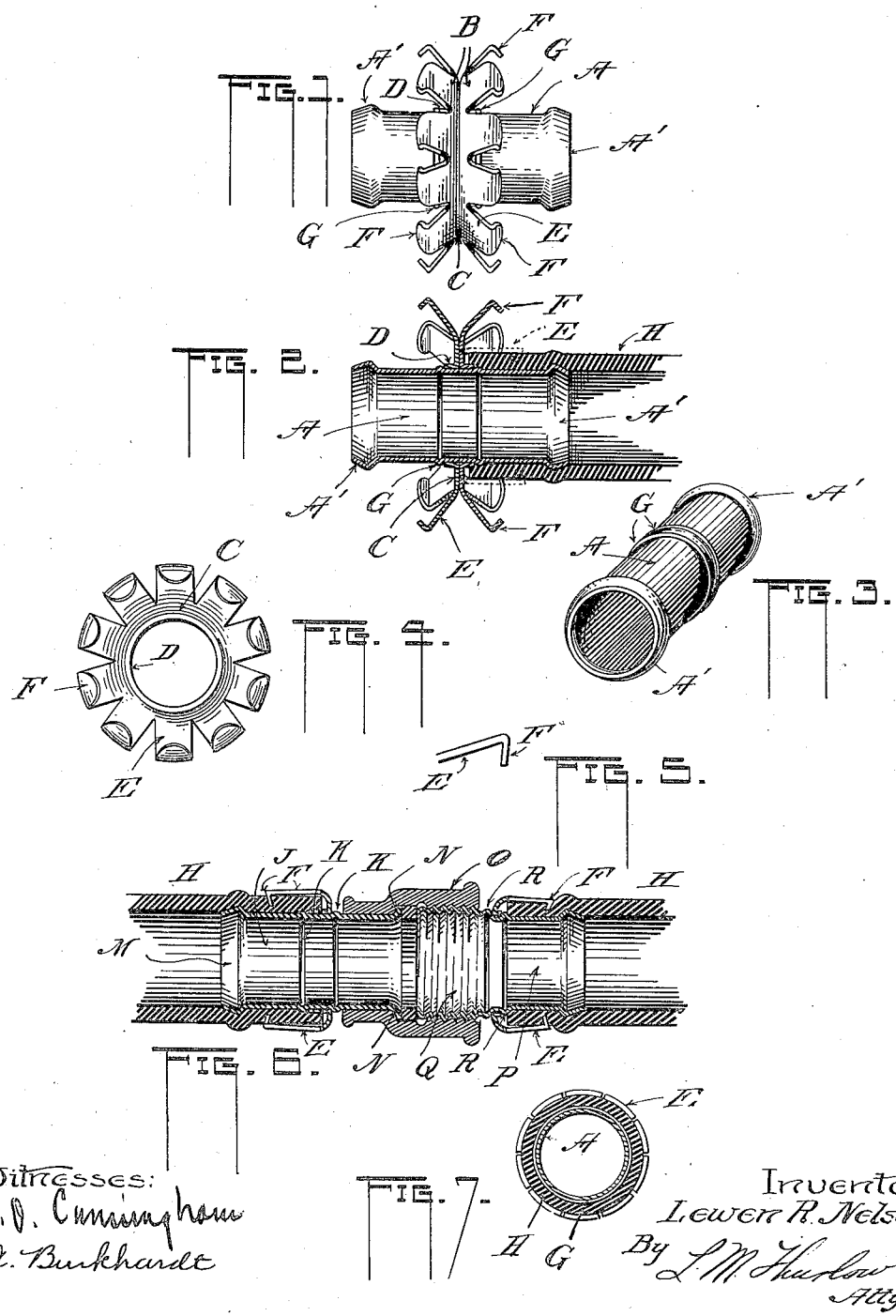

LEWEN R. NELSON, OF PEORIA, ILLINOIS, ASSIGNOR OF ONE-HALF TO STUBER & KUCK, OF PEORIA, ILLINOIS, A COPARTNERSHIP.

HOSE-CONNECTOR.

946,703.

Specification of Letters Patent.   Patented Jan. 18, 1910.

Application filed March 25, 1909. Serial No. 485,851.

*To all whom it may concern:*

Be it known that I, LEWEN R. NELSON, citizen of the United States, residing at Peoria, in the county of Peoria and State of Illinois, have invented certain new and useful Improvements in Hose-Connectors; and I do hereby declare that the following is a full, clear, and exact description of the invention, which will enable others skilled in the art to which it appertains to make and use the same.

This invention relates to a hose connector and belongs to that class of devices used for joining the ends of hose sections; pertaining both to a mender for permanently connecting the ends of a broken hose and to a separable coupling or connector for connecting hose sections or for connecting a hose with a faucet, pipe or other fixture.

An object of the invention, therefore, is to provide a connector in one of its forms for permanently connecting hose sections and in another form for connecting them so that they may be separated from one another.

Another object of the invention is to construct a coupling of simple form of sheet metal and formed tubing whereby it can be produced at a very low cost.

Another object is to construct a hose coupling of sheet metal and formed tubing whose members though of separate parts can be assembled as a single complete article the parts of which are inseparable.

One of the peculiarities of my hose connector is that I am enabled to construct all the parts of one of the forms of the device of sheet metal and tubing having the quality of ductility so that the parts may be preferably assembled and made inseparable. Again, the construction of my connector of ductile metal is such that certain integral hose clamping fingers are arranged so as to lie close to one another and clamp upon the full periphery of the hose-end, which they clamp and lie flat upon the same, so as to absolutely prevent leakage. And still again the said fingers are provided with friction points or spurs formed preferably at an acute angle to the planes thereof so that when in engagement with the hose they offer a great resistance to the movement of the hose in its tendency to leave the coupling.

The means by which these and other advantages are attained will be pointed out in the following specification aided by the drawing in which:—

Figure 1 is an elevation of a form of connector as I prefer to construct it. Fig. 2 is a longitudinal section of the same showing a piece of hose in connection therewith. Fig. 3 is a perspective view of the body of the connector. Fig. 4 is a plan of one of the members of the connector. Fig. 5 is a side elevation of one of the arms or fingers of the member shown in Fig. 4 and much enlarged. Fig. 6 is a longitudinal section of the connector as used for connecting two separable hose sections. Fig. 7 is a cross section of the connector and a piece of hose showing the relative positions of a series of clamping fingers.

A indicates a hollow cylindrical member either "formed up" from a piece of sheet metal or cut from drawn tubing or ductile metal and constituting the body of the connector.

B is a ring or collar punched from sheet metal and substantially of the form shown in Figs. 1 and 4. This has a central flat body portion C and from it a cylindrical flange D is struck up and this flange is adapted to slip upon and snugly fit the body A. The said collar is dished so as to overhang the flange and is serrated to create lugs or fingers E whose extremities are bent inwardly to produce the friction points or spurs F to engage the hose and all of which point toward the axis of the bore of the ring and each is disposed at an acute angle to the plane of the lug or finger of which it is a part as clearly illustrated in Fig. 5. In the first two figures of the drawing I have shown two of these rings D placed back to back and slipped upon the body or tube A and stationed at about the middle thereof, said rings being held rigidly in position by means of flanges or ribs G, or their equivalent, although other means of securing the parts together may be resorted to, and I preferably employ the well known swaging process as the easiest method of creating said flanges or ribs or their equivalents.

The tube or body A is preferably expanded at each end in any desired manner in order to provide a head or flange A' to aid in holding the hose although these may not be used.

Fig. 2 illustrates the position of the swaged ribs G and the manner in which they prevent movement of the rings B and also illustrates the head or flange A' and the position of a hose section denoted by the letter H. This figure shows in dotted lines substantially the position of one of the fingers E at each side of the hose when bent down upon the latter and it is to be noted that the spurs F, which have been described as being formed at an acute angle to the fingers, when pressed into the hose extend rearwardly and inwardly toward the flange D or toward the end of the hose, substantially in the manner shown, in such a way that resistance to the withdrawal of the hose results since said spurs constitute what might be termed "harpoon" points that will prevent such withdrawal.

Besides the purpose of utilizing the device as a permanent connection between hose sections there is that of using it to detachably connect two pieces of hose or to detachably connect the end of a hose with a faucet or other fixture as has already been stated and Fig. 6 shows the manner of accomplishing the latter object. A tube or body J corresponding to A of the other figures is provided as before with its flanges K corresponding to G of the other figures but in place of having two of the rings B but one is employed. The said member J is provided with a head or flange M as before while the other end is flared to form a flange N and said end carries an internally threaded member O adapted to turn or swivel on said member J the flared end N being provided to hold the member O in place. P is also one of the tubular bodies having part of its length provided with screw-threads Q to be engaged by the threads of the said member O. The flanges R of the body P which correspond with those at G Fig. 2, serve as before to hold the ring B; said member P being otherwise identical in form with that described in the earlier figures. It will now be seen that the member J having the swiveled portion O may be connected with the member P or with a faucet or other fixture having the proper threads to receive it.

In view of the foregoing adaptability of the connector last above described the device is not therefore confined to the use of two rings C combined with the body A since but one of the rings will act in the important capacity stated. The flange N of the tube J could take the place of the form of flange A' of the earlier figures and if desired the said member J could be secured by its flange N, or its equivalent, to a tank or other fixture and a hose could be attached to the other end of the tube by means of the fingers and their spurs.

By providing the cylindrical flange D to fit upon the member A the rings are given a larger bearing upon the latter and are stronger and consequently will withstand greater strain than without them.

As formed, the fingers E when bent down into engagement with the hose lie in close relation and cover all of the end of the hose as shown in Fig. 7 forming practically a complete band.

The connector is distinguished from the prior art in having enlargements or heads at its ends greater in diameter than the body of the tube and in having the spurs of the fingers lying just behind them so that the hose ends after being stretched or forced over the said enlargements or heads and contracting to their normal diameters upon the body will be engaged by said spurs. When the hose is stretched beyond its normal interior diameter there is a chance for leakage and it is preferable to have the fingers of such a length that when bent down upon the hose their spurred ends will lie just behind the heads for instance as shown in Fig. 6 so that the hose will be securely held behind said heads and that the spurs will bind the hose directly to the tube. In providing a structure that will permit the hose to resume its normal diameter upon the body after passing over the heads and then binding it behind said heads by the closely lying or adjoining fingers, leakage is entirely prevented and the hose cannot move upon nor leave the body or tube.

By reason of being constructed entirely of sheet metal my connector is particularly and peculiarly adapted for a fire-hose since it is strong and of light weight and can withstand an exceedingly heavy pressure. Hose connectors heretofore provided for this particular use have generally been castings necessarily heavy in order that they would be strong and the great weight and consequent high cost prohibited their general use.

Although it is intimated that ductile metal is preferable it is possible to cast certain of the parts of the connector and interlock therewith other parts of ductile metal so that a cheaper and more easily made device is possible than is the case when a solid or one-piece casting is used.

In bringing out the invention having the advantages described I seek to include the equivalent of what is shown and described.

I claim:—

1. A hose connector consisting of a tube for insertion at one end into a hose, a ring carried by the tube and provided with a series of fingers directly adjoining at their bases, said tube having an enlargement at its inserted end greater in diameter than the bore of ring, the fingers of said ring adapted to be forced down upon the hose between the said enlargement and the position of the ring with their free ends all extending toward said enlargement.

2. A hose connector consisting of a tube for insertion at one end into a hose, a ring carried by the tube and provided with a series of fingers directly adjoining at their bases, said tube having an enlargement at its inserted end greater in diameter than the bore of the ring, the fingers of said ring having spurs and adapted to be forced down upon the hose between the said enlargement and the position of the ring, the free ends of the fingers all extending toward said enlargement.

3. A hose connector consisting of a tube for insertion at one end into a hose, a ring carried by the tube and provided with a series of fingers directly adjoining at their bases, said tube having an enlargement at its inserted end greater in diameter than the bore of the ring, said ring being remote from said enlargement, the fingers of said ring having spurs, both the fingers and the spurs adapted to be forced down upon the hose between the enlargement and the position of the ring, the free extremities of all the fingers extending toward said enlargement, and means for preventing the removal of the ring from the member in a longitudinal direction.

4. A hose connector consisting of a tube for insertion at one end into a hose and having an enlargement at that end, a separate ring carried by the tube and provided with a series of fingers directly adjoining at their bases and all extending in one direction and having inwardly extending spurs adapted to be forced down upon and to engage the hose immediately behind the enlargement and between said enlargement and the position of the ring, said fingers when clamped down upon the hose constituting substantially a continuous band around said hose, and means to hold the ring from leaving said tube in one direction.

5. A hose connector consisting of a straight tubular member for insertion at one end into a hose and having an enlargement at that end, a separate ring mounted on the member, means to prevent its removal in either direction, said ring having a series of fingers adjoining at their bases and adapted to be bent down flat upon the hose and to adjoin at their edges and constitute substantially a continuous bond around said hose, their extremities having spurs thereon to engage the hose immediately behind said enlargement.

6. A hose connector consisting of a straight tubular member for insertion into a hose and having an enlargement at its inserted end, a separate ring carried by the member and provided with a series of fingers, means on the member between the ring and the enlargement to prevent movement of the ring, all of said fingers adapted to be bent down upon the hose and extend in but one direction, their edges adapted to adjoin when bent down and constituting substantially a continuous bond around the hose, their ends extending to and terminating at the enlargement and provided with spurs at their said extremities to engage the hose immediately behind the enlargement and between said enlargement and the said lateral extension.

7. A hose connector consisting of a straight tubular member of ductile metal adapted for receiving a hose at one end and having a lateral extension upon its exterior surface, a ring carried by and surrounding the member, the said lateral extension having its position between the ring and the hose-receiving-end of the member and adapted to prevent the ring from leaving the member in one direction, said ring having a series of fingers adjoining at their bases and adapted to be bent down upon the hose with their edges abutting to entirely inclose said hose, and provided with spurs to engage said hose, and means in conjunction with the said fingers and their spurs to assist in holding the hose.

8. A hose connector consisting of a straight tubular member of ductile metal adapted for receiving a hose at one of its ends and having a lateral extension upon its exterior surface, a ring carried by and surrounding the member and having a series of fingers adjoining at their bases and all extending in one direction and overhanging the said lateral extension and overlying the hose and provided at their ends with spurs to engage the hose the said member having an integral enlargement at its extremity over which said hose is drawn, the said enlargement lying between the end of the member and the said spurs.

9. A hose connector consisting of a straight tubular member for insertion into a hose and having two annular flanges on its outer surface, a ring carried by and surrounding the member between the flanges and provided with a series of fingers adjoining at their bases and adapted to be bent down upon the hose the edges of the fingers adapted to abut and to constitute substantially a continuous band around said hose.

10. In a hose connector, a straight tubular member of ductile metal for insertion into a hose and having an enlargement at one end greater in diameter than the largest diameter of said member and having an annular flange between its ends, a ring carried by and surrounding the member adjacent to the flange and having a series of fingers adjoining at their bases and adapted to be bent down upon the hose and when bent down having their edges abutting to constitute substantially a continuous band around said hose, said fingers having spurs to engage the hose between the enlargement and said flange.

11. In a hose connection, a straight tubular member of ductile metal for insertion into a hose and having an enlargement at one end and also having two annular flanges on its outer surface, a ring carried by and surrounding the member between the flanges and provided with a series of fingers adjoining at their bases and adapted to be bent down upon the hose and all extending in one direction and when bent down constituting a substantially continuous band around the hose.

12. In a device of the class described, a tubular member having an enlargement at one end and adapted to receive a hose, a pair of rings on said member, each having a series of fingers adjoining at their bases and adapted to be bent down upon the hose, both series of fingers facing in opposite directions, and means on the member to inclose the rings to secure them in position.

13. In a device of the class described, a tubular member of ductile metal having an enlargement at one end and adapted to receive a hose, a pair of rings on said member each having a series of fingers adjoining at their bases, each said series extending in opposite directions and adapted to be bent down upon the hose with their edges abutting, and an annular flange on the member on its outer surface in two places to inclose the rings and hold them in position.

14. In a device of the class described, a tubular member having an enlargement at one end and adapted to receive a hose at that end, a pair of rings on said tubular member, each having a series of fingers provided with spurs, the spurs of one ring facing in a direction opposite to that of the other ring, and means integral with the tubular member and formed at each side of the two rings to secure the latter in position, the tubular member and rings thereby constituting a single structure complete in itself.

15. A hose connection comprising a straight tubular member to receive the end of the hose and having an enlargement at each end, a pair of rings thereon the diameters of whose bores are less than that of the enlargements, said rings provided with a series of fingers adjoining at their bases, those of each series extending in opposite directions and adapted to be bent down parallel to one another upon the hose and adapted to constitute substantially a continuous band around the hose between the rings and the enlargements.

In testimony whereof I affix my signature, in presence of two witnesses.

LEWEN R. NELSON.

Witnesses:
L. M. THURLOW,
E. J. ABERSOL.